(12) United States Patent
Lu et al.

(10) Patent No.: US 11,346,275 B2
(45) Date of Patent: May 31, 2022

(54) APPARATUS FOR OPTIMIZING FUEL/AIR MIXING PROCESS OF INTERNAL COMBUSTION ENGINE

(71) Applicant: Tianjin University, Tianjin (CN)

(72) Inventors: Zhen Lu, Tianjin (CN); Caifeng Hao, Tianjin (CN); Tianyou Wang, Tianjin (CN)

(*) Notice: Subject to any disclaimer, the term of this patent is extended or adjusted under 35 U.S.C. 154(b) by 0 days.

(21) Appl. No.: 17/344,836

(22) Filed: Jun. 10, 2021

(65) Prior Publication Data

US 2021/0310403 A1  Oct. 7, 2021

Related U.S. Application Data

(63) Continuation of application No. PCT/CN2020/103469, filed on Jul. 22, 2020.

(30) Foreign Application Priority Data

Apr. 7, 2020  (CN) .......................... 202010263821.X

(51) Int. Cl.
*F02B 23/06* (2006.01)
*F02F 1/42* (2006.01)
(Continued)

(52) U.S. Cl.
CPC .......... *F02B 23/0651* (2013.01); *B33Y 80/00* (2014.12); *F02F 1/242* (2013.01);
(Continued)

(58) Field of Classification Search
CPC .............. F02B 23/0651; F02B 23/0696; F02B 23/0624; F02B 23/0618; F02B 2275/40;
(Continued)

(56) References Cited

U.S. PATENT DOCUMENTS 3,253,584 A   5/1966  Traub et al.
3,295,506 A   1/1967  Wisniowski
(Continued)

FOREIGN PATENT DOCUMENTS

CN   1717537 A   1/2006
CN   1717538 A   1/2006
(Continued)

OTHER PUBLICATIONS

Internation Search Report of PCT/CN2020/103469, dated Jan. 4, 2021.

*Primary Examiner* — Grant Moubry

(57) ABSTRACT

The present invention discloses an apparatus for optimizing the fuel/air mixing process of an internal combustion engine. The bottom surface of the cylinder head is provided with a plurality of brackets; a ring is fixed to the brackets; and the ring may be an integrated ring body and may also be composed of a plurality of small segments. The ring is positioned opposite to a fuel injector and located in an area where fuel flows in the combustion chamber. The ring can continuously guides the fuel during the fuel injection process. The ring can be arranged in the liquid-phase region, the gas-liquid two-phase region or the gas-phase region. When the location of the ring interferes with the movement of valves of the internal combustion engine, the part of the ring body that interferes with the movement of the valves can be removed.

2 Claims, 3 Drawing Sheets

(51) Int. Cl.
*F02F 1/24* (2006.01)
*B33Y 80/00* (2015.01)

(52) U.S. Cl.
CPC ........ *F02F 1/4214* (2013.01); *F02B 23/0624* (2013.01); *F02B 23/0696* (2013.01); *F02B 2275/40* (2013.01); *F02F 2200/06* (2013.01)

(58) Field of Classification Search
CPC ...... F02F 1/4214; F02F 1/242; F02F 2200/06; F02M 29/04; B33Y 80/00
See application file for complete search history.

(56) References Cited

U.S. PATENT DOCUMENTS

| | | | | |
|---|---|---|---|---|
| 5,803,042 | A * | 9/1998 | Bortone | F01L 5/045 |
| | | | | 123/188.4 |
| 7,011,070 | B2 * | 3/2006 | Hill | F02B 23/0669 |
| | | | | 123/298 |
| 7,213,564 | B2 * | 5/2007 | Hill | F02B 23/0651 |
| | | | | 123/298 |
| 9,587,606 | B2 * | 3/2017 | Anders | F02M 61/1833 |
| 9,803,538 | B2 * | 10/2017 | Anders | F02B 23/0648 |
| 10,012,196 | B1 * | 7/2018 | Qi | F02B 23/0651 |
| 2013/0245917 | A1 | 9/2013 | Meyer | |

FOREIGN PATENT DOCUMENTS

| | | |
|---|---|---|
| JP | S62178716 A | 8/1987 |
| JP | H07133723 A | 5/1995 |

* cited by examiner

APPARATUS FOR OPTIMIZING FUEL/AIR MIXING PROCESS OF INTERNAL COMBUSTION ENGINE

CROSS-REFERENCE TO RELATED APPLICATIONS

This application is a continuation of International Patent Application No. PCT/CN2020/103469 with a filing date of Jul. 22, 2020, designating the United States, now pending, and further claims priority to Chinese Patent Application No. 202010263821.X with a filing date of Apr. 27, 2020. The content of the aforementioned applications, including any intervening amendments thereto, are incorporated herein by reference.

TECHNICAL FIELD

The present invention belongs to the technology of an internal combustion engine structure, and particularly relates to an apparatus for optimizing a combustion fuel/air mixing process of an internal combustion engine.

BACKGROUND OF THE PRESENT INVENTION

The combustion mode of the diesel engine is commonly composed of premixed combustion mode and diffusion combustion mode. Most of the fuel is injected into the cylinder on the condition of combustion state, and the fuel is then burnt along with the mixing process of the fuel and air. However, the mixing process is slower than the combustion process, and the combustion rate depends on the mixing rate. High-quality fuel/air mixture formation is beneficial for the combustion characteristics of the diesel engine, and achieves the purposes of increasing the power, and reducing the fuel consumption and emission.

Researches on optimization of the fuel/air mixing process of the diesel engine mainly focus on the following aspects: (1) increase of the fuel injection pressure: high fuel injection pressure can atomize the fuel better, increase a fuel quality, penetration distance and make full use of the air in the combustion chamber, which is conducive to improving the fuel/air mixing; (2) optimization of the fuel injection angle: the fuel injection angle mainly affects the radial distribution of fuel, and the optimal angle can make better use of the air in the squish region and the combustion chamber pit; (3) optimization of the intake port structure: appropriate airflow movement promotes the mixing of fuel and air; and (4) optimization of the combustion chamber structure: effects on promoting vortex, guiding the fuel and organizing the local flow can be achieved. However, the fuel injection pressure is impossible to increase without limitation. The optimization of fuel injection angle is limited by the development of fuel injector; the optimization of intake port structure will be limited by the layout limitation of the cylinder head; and the optimization of the combustion chamber structure is limited by the compression ratio and its structural strength. When the diesel engine runs, the relative position between the combustion chamber and the fuel injector is changed along with the down movement of the piston, and the optimal effect of the combustion chamber on guiding the fuel cannot last the whole fuel injection process. When the internal combustion engine is in a large load state, the problems of low air utilization rate in the squish region, excessively high local concentration inside the combustion chamber pit and more fuel attached to the wall surface are more apparent. For the problems, the present invention discloses an apparatus which is disposed inside the combustion chamber and can greatly improve the fuel/air mixing quality.

SUMMARY OF PRESENT UTILITY MODEL

The purpose of the present invention is to provide an apparatus for optimizing the fuel/air mixing process of diesel engines, which can apparently improve the combustion characteristics of diesel engines.

The principle and structural solution of the apparatus for optimizing the fuel/air mixing process of an internal combustion engine is as follows: several brackets are arranged on the bottom surface of the cylinder head; a ring is fixed to the brackets; the ring may be an integrated ring body and may also be composed of a plurality of small segments, and the number of the small segment ring bodies is equal to or less than the number of valves in internal combustion engine.

The ring is in the area where fuel flows in the combustion chamber and is fixed by the brackets. Because the position between the ring and fuel injector is fixed. The interactions between the ring and fuel can last during the whole injection duration with the relatively fixed position between the ring and injector, which leads to a great improvement for fuel/air mixing process.

The ring is located in the area where the fuel flows in the combustion chamber and may be arranged in the liquid-phase region, the gas-liquid two-phase region or the gas-phase region. When the location of the ring interferes with the movement of the valves in internal combustion engine, part of the ring body that interferes with the movement of the valves can be removed.

The ring is a spoiler in the combustion chamber. The apparatus is arranged on the bottom surface of the cylinder head; the ring is located in the area where the fuel flows by in the combustion chamber; when the fuel begins to inject, the fuel may be assigned into the liquid-phase region, the gas-liquid two-phase coexistence area and the gas-phase region; and the ring can be arranged respectively in the liquid-phase region, the gas-liquid two-phase coexistence area and the gas-phase region according to the design need. Because the relative positions between the ring and the fuel injector are fixed, the ring can continuously guide the fuel in the fuel injection process.

When the ring is arranged in the liquid-phase region and the fuel moves to the position where the ring is located, the nozzle angle of the fuel can be enlarged to certain extent so as to promote the mixing of the fuel and the air; when the ring is arranged in the gas-phase two-phase coexistence area and the gas-phase region and the fuel moves to the position where the ring is located, the fuel is divided into an upper portion and a lower portion, and the upper portion of the fuel is mixed with the air in a squish region; and the lower portion of the fuel is prevented from directly contacting the bottom of a combustion chamber pit under the guide effect of the ring and is mixed with the air in the combustion chamber pit, so that the problems of the ω-type combustion chamber that is widely used at present, such as low air utilization rate in the squish region, excessively high local concentration inside the pit and more fuel attached to the wall surface, can be solved.

The present invention has the characteristics and beneficial effects as follows: the problems of the diesel engine combustion chamber such as low air utilization rate in the squish region, excessively high local concentration inside the pit and more fuel attached to the wall surface can be solved; the flow in the cylinder is promoted; the heat release rate at the medium term of the combustion is increased; the entire combustion heat release process is more concentrated; the average temperature in the cylinder is increased; the combustion duration is shortened; and at the same time, in a case of little change in burst pressure, the power is increased, and emissions of non-combusted HC and SOOT are reduced.

DETAILED DESCRIPTION OF PREFERRED EMBODIMENTS

Figure 1:
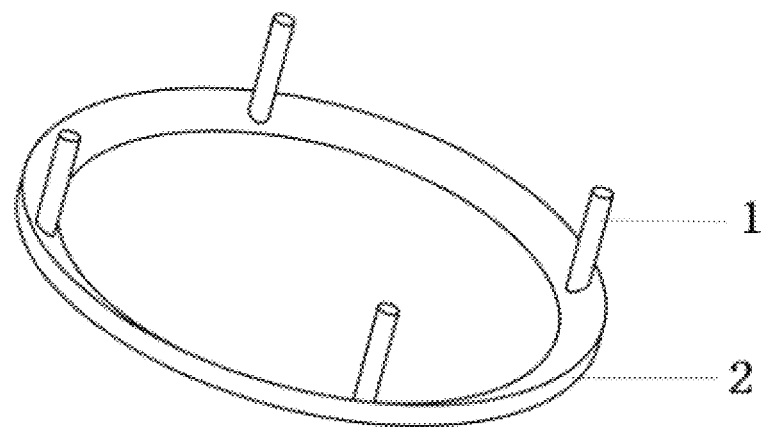
FIG. 1 is a structural schematic diagram of brackets and a ring in the present invention.

A structural apparatus of the present invention is further described below in combination with the embodiments and accompanying drawings.

A specific technological structure of an apparatus for optimizing a fuel/air mixing process of an internal combustion engine is as follows: the bottom surface of the cylinder head 3 is provided with a plurality of brackets 1; a ring 2 is fixed to the brackets; the ring may be an integrated ring body and may also be composed of a plurality of small segments, and the number of the small segment ring bodies is equal to or less than the number of air valves of the internal combustion engine. The ring is positioned opposite to a fuel injector 4. The ring continuously guides fuel in the fuel injection process. The ring is located in an area where the fuel flows by in the combustion chamber and may be arranged in the liquid-phase region 5-1, the gas-liquid two-phase region 5-2 or the gas-phase region 5-3. When the location of the ring interferes with the movement of the valves 6 of the internal combustion engine, part of the ring body that interferes with the movement of the valve can be removed.

The brackets can be fixed on the bottom surface of the cylinder head through a bolt connection way, a welding way or an interference fit way. The ring can also be connected with the brackets through a bolt connection way, a welding way or an interference fit way. The brackets and the ring can also be connected through 3D printing and integrated casting.

The cross sections of the brackets are circular; and the cross section of the ring is triangular, or arc, or circular or quadrilateral.

Figure 3:
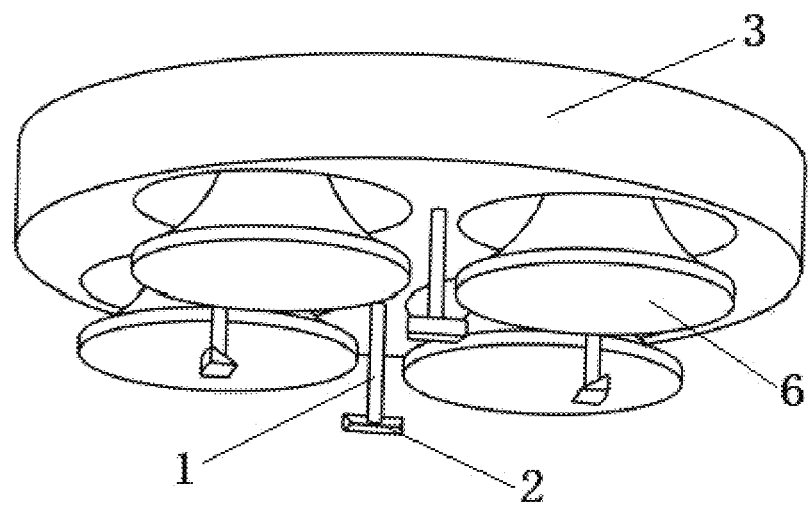
FIG. 3 is a schematic diagram of a ring installed on a bottom surface of a cylinder head in sections.

In the present embodiment, since the ring does not interfere with the movement of the valves, the apparatus for optimizing the fuel/air mixing process of the internal combustion engine is composed of four brackets and a complete ring (as shown in FIG. 1). The ring plays a role of a spoiler in the combustion chamber. As a turbulent apparatus, the ring must be installed in an area affected by the injected fuel. The location of the ring corresponds to a fuel injector. If the location of the ring conflicts with movement trajectories of the valves of the internal combustion engine, for the engine with N valves, part of the ring that interferes with the valves can be removed, and then the ring is not a complete ring body. The ring is divided into a plurality of small ring segments according to practical situation (as shown in FIG. 3).

Figure 2:
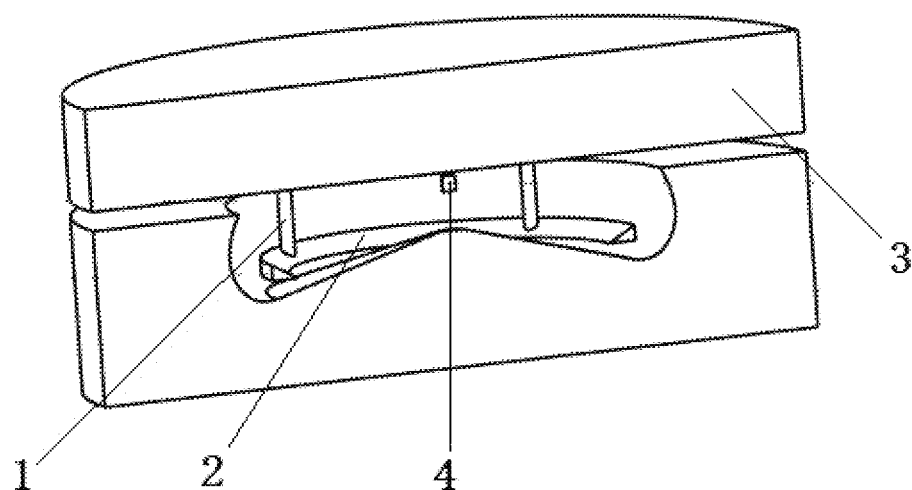
FIG. 2 is a schematic diagram of a whole ring installed on a bottom surface of a cylinder head in the present invention.

In the present embodiment, the cylinder diameter of the heavy-duty diesel engine is 110 mm, and the cross section of the ring used is in a shape of a right-angled triangle: the lateral edge length is 4 mm, and the taper angle is 30°; and the ring is arranged on a position that is about ½ away from the center of the cylinder and located in the area where the fuel liquid phase and the gas phase coexist. Since the apparatus does not interfere with the movement of the valves, the entire ring can be fixed on the bottom surface of the cylinder head (as shown in FIG. 2).

Figure 4:
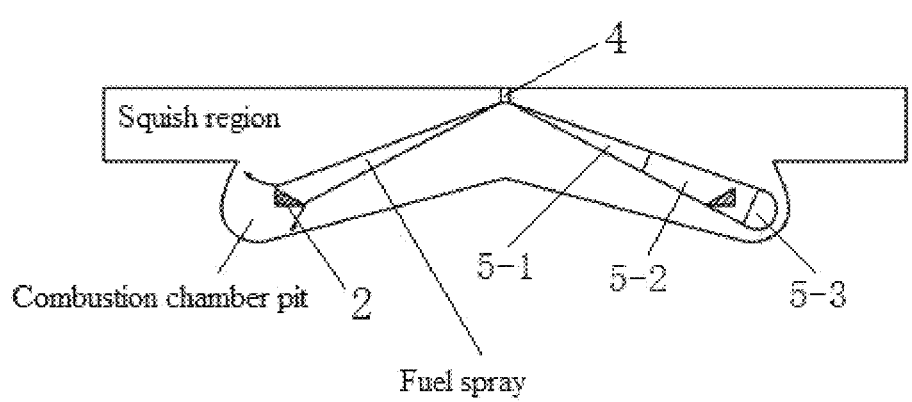
FIG. 4 is a schematic diagram of a fuel/air distribution principle in a combustion chamber of a diesel engine after optimization.

Results show that when the apparatus is not added, there is basically no fuel/air mixture in the squish region, and after the fuel injection is finished, the fuel/air equivalent ratio in a majority of area in the combustion chamber pit is greater than 2 (as shown in FIG. 4). The problems of the combustion chamber such as low air utilization rate in the squish region, excessively high local concentration inside the pit and more fuel attached to the wall surface are obvious, and the fuel/air mixing quality is relatively poor.

Figure 5:
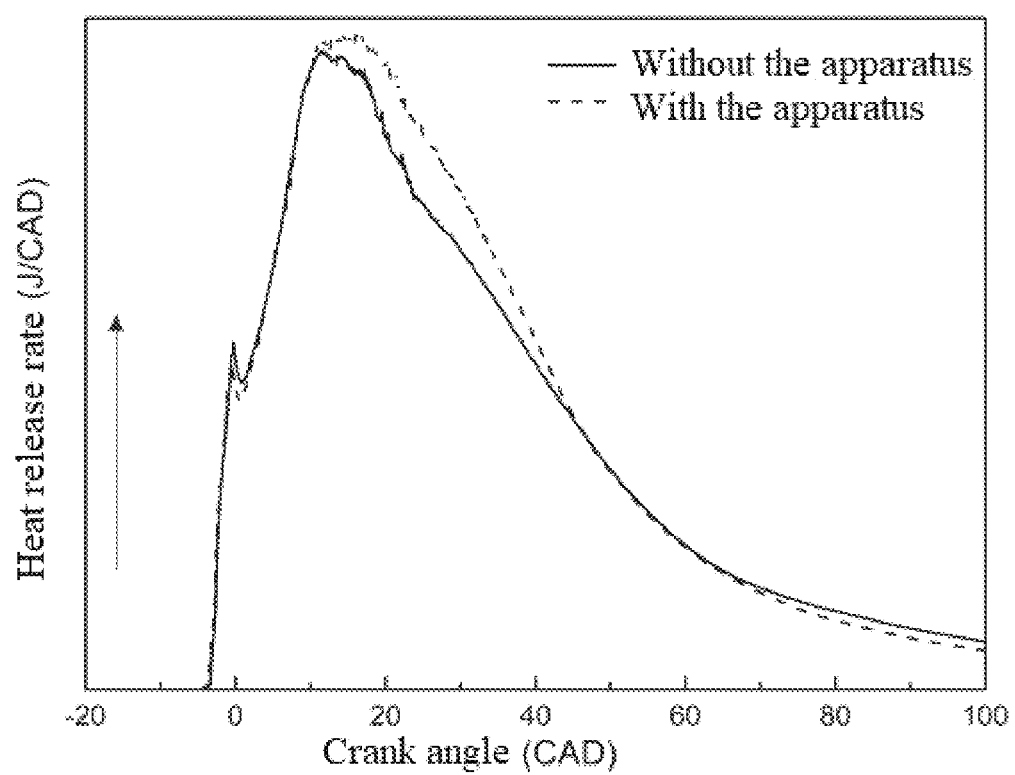
FIG. 5 is a curve chart showing comparison of heat release rate effects of a diesel engine before and after the apparatus is added.

When the apparatus is added, the fuel is divided into two portions when moving to the position where the ring is located, and the upper portion of the fuel is mixed with the air in the squish region, so that the air utilization rate nearby the squish region is increased. The guide effect of the triangular ring makes the lower portion of the fuel injected into the pit to be mixed with the air in the pit, thereby avoiding direct contact with the wall surface. After the fuel injection is finished, the fuel/air equivalent in a majority of area of the combustion chamber pit is about 1, so that the problems that the local concentration inside the combustion chamber pit is excessively high and excessive fuel is attached to the wall surface can be solved. Under the effect of the ring, a vortex is formed between the ring and the wall surface of the combustion chamber, so that the flow in the cylinder is promoted, which is conducive to forming a more-homogeneous fuel/air mixture (as shown in FIG. 4). The high-quality fuel/air mixture enables the fuel to be combusted more sufficiently, the flame propagation speed is apparently increased, and the heat release rate at the middle term of the combustion is apparently increased (as shown in FIG. 5). Compared with the engine without the apparatus, the combustion duration is shortened by 7° CA, the combustion rate is increased by 12%, the power is increased by 4%, and the soot emission and the emission of non-combusted HC are reduced about 30%.

We claim:

1. An apparatus for optimizing a fuel/air mixing process of an internal combustion engine, comprising a cylinder head, wherein a bottom surface of the cylinder head is provided with a plurality of brackets; a ring is fixed to the plurality of brackets; the ring is composed of a plurality of segments; a number of the plurality of segments is equal to or less than a number of air valves of the internal combustion engine; the ring is positioned opposite to a fuel injector; the ring is configured for continuously guiding the fuel during a fuel injection process; the ring is arranged in a liquid-phase region, a gas-liquid two-phase region or a gas-phase region where the fuel flows;

a cross section of each segment is in a shape of a right-angled triangle, a lateral edge length of the right-angled triangle is 4 mm, and an acute angle of the right-angled triangle is 30°.

2. The apparatus for optimizing the fuel/air mixing process of the internal combustion engine according to claim 1, wherein the plurality of brackets are fixed on the bottom surface of the cylinder head through a bolt connection way, a welding way or an interference fit way; the ring is connected with the plurality of brackets through a bolt connection way, a welding way, an interference fit way, 3D printing or integrated casting.

* * * * *